US00RE48519E

(19) United States
(12) Reissued Patent
Shalev

(10) Patent Number: US RE48,519 E
(45) Date of Reissued Patent: Apr. 20, 2021

(54) TODDLER FORK

(71) Applicant: ELLI & NOOLI, LLC, Los Angeles, CA (US)

(72) Inventor: Maya Shalev, Los Angeles, CA (US)

(73) Assignee: ELLI & NOOLI, LLC, Los Angeles, CA (US)

(21) Appl. No.: 29/729,403

(22) Filed: Mar. 26, 2020

Related U.S. Patent Documents

Reissue of:
(64) Patent No.: Des. 799,910
Issued: Oct. 17, 2017
Appl. No.: 29/558,965
Filed: Mar. 23, 2016

U.S. Applications:
(62) Division of application No. 29/704,367, filed on Sep. 4, 2019, which is an application for the reissue of Pat. No. Des. 799,910.

(51) LOC (13) Cl. ..... 07-03
(52) U.S. Cl.
USPC ..... D7/653
(58) Field of Classification Search
USPC ..... D7/402.1, 642–645, 653–664, 691; D8/107, 14; D21/525
CPC .... A47G 21/00; A47G 21/004; A47G 21/005; A47G 21/023; A47G 21/04; A47G 21/06; A47G 21/08; A47J 43/28; A47J 43/281; A47J 43/282
See application file for complete search history.

(56) References Cited

U.S. PATENT DOCUMENTS

D148,693 S * 2/1948 Grosvenor ..... D7/644
D336,520 S * 6/1993 McDaniel ..... D24/194
D339,036 S * 9/1993 McDaniel ..... D7/643
D339,063 S * 9/1993 Simon ..... D9/432
D349,770 S * 8/1994 Jarnagin ..... D24/198
D413,049 S * 8/1999 Bergkvist ..... D7/653
D419,397 S * 1/2000 Liu ..... D7/663
(Continued)

*Primary Examiner* — Philip S Hyder
(74) *Attorney, Agent, or Firm* — K&L Gates LLP

(57) CLAIM

The ornamental design for a toddler fork, as shown and described herein.

DESCRIPTION

*Notice: More than one reissue application has been filed for the reissue of U.S. Pat. No. D. 799,910. This application is a reissue divisional of U.S. application Ser. No. 29/704,367, which is an application for reissue of U.S. Pat. No. D. 799,910.*

FIG. 1 illustrates a side view of a toddler fork showing my new design, the opposite side view being a mirror image thereof.

FIG. 2 illustrates a top plan view of the toddler fork of FIG. 1.

FIG. 3 illustrates a bottom plan view of the toddler fork of FIG. 1.

FIG. 4 illustrates a front elevational view of the toddler fork of FIG. 1.

FIG. 5 illustrates a perspective view of the top-side of the toddler fork of [FIG. 1; and,] *FIG. 1.*

FIG. 6 illustrates a perspective view of the bottom-side of the toddler fork of FIG. 1.

Any broken lines in the drawings are for illustrative purposes only and form no part of the claimed design. Additionally, the toddler fork is not limited to the scale shown herein.

1 Claim, 6 Drawing Sheets

Matter enclosed in heavy brackets [ ] appears in the original patent but forms no part of this reissue; matter printed in italics indicates the additions made by reissue.

AMENDED

(56) References Cited

U.S. PATENT DOCUMENTS

| | | | | | |
|---|---|---|---|---|---|
| 6,134,790 | A | * | 10/2000 | Watson | A47G 21/02 30/295 |
| D482,248 | S | * | 11/2003 | Roehrig | D7/663 |
| D491,420 | S | * | 6/2004 | Shibata | D7/653 |
| D496,833 | S | * | 10/2004 | Lantz | D7/653 |
| D582,046 | S | * | 12/2008 | Rohrig | D24/194 |
| D592,019 | S | * | 5/2009 | Holcomb | D7/643 |
| D615,367 | S | * | 5/2010 | Sierra | D7/653 |
| D621,229 | S | * | 8/2010 | De Bretton Gordon | D7/645 |
| D657,621 | S | * | 4/2012 | Pookrum | D7/401.2 |
| D682,613 | S | * | 5/2013 | De Leo | D7/401.2 |
| D695,361 | S | * | 12/2013 | Roehrig | D21/525 |
| D707,307 | S | * | 6/2014 | Roehrig | D21/525 |
| D789,160 | S | * | 6/2017 | Strandberg | D7/643 |
| D834,381 | S | * | 11/2018 | Appelbaum | D7/653 |
| D834,382 | S | * | 11/2018 | Appelbaum | D7/653 |
| D850,197 | S | * | 6/2019 | Thrailkill | D7/401.2 |

* cited by examiner

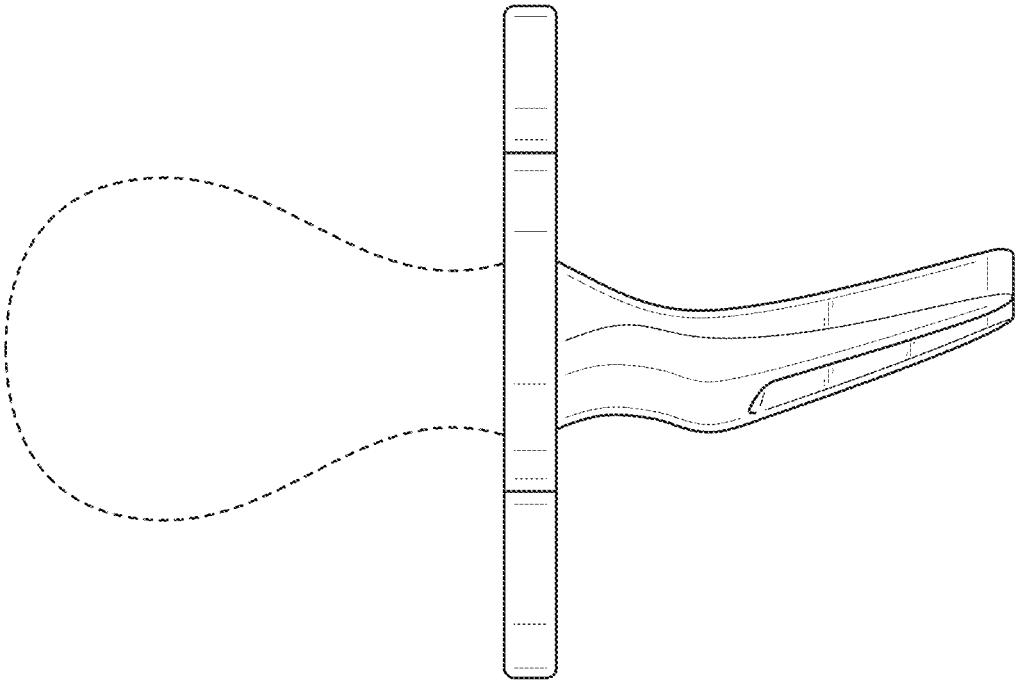
FIG. 1 AMENDED

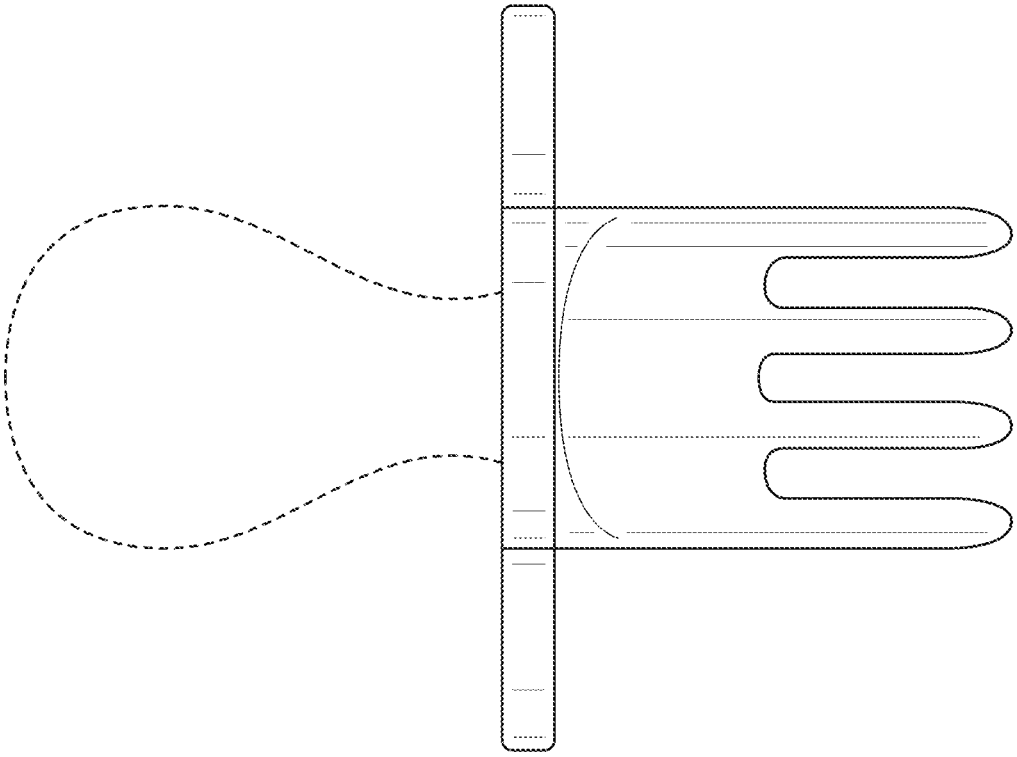
FIG. 2 AMENDED

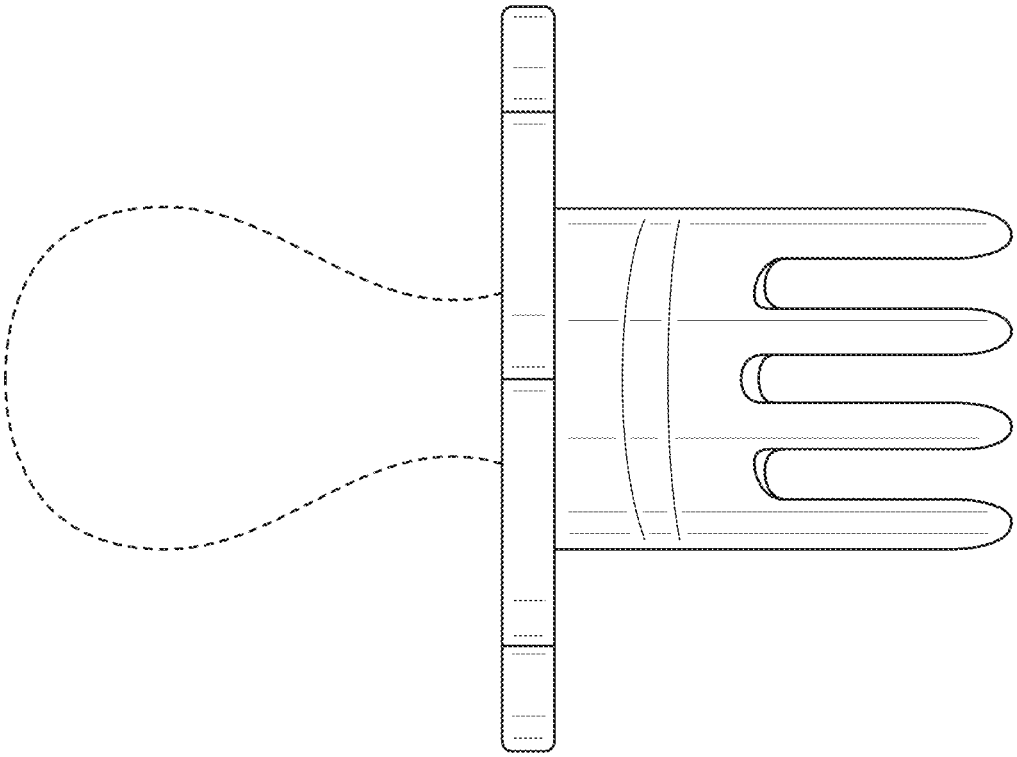
FIG. 3 AMENDED

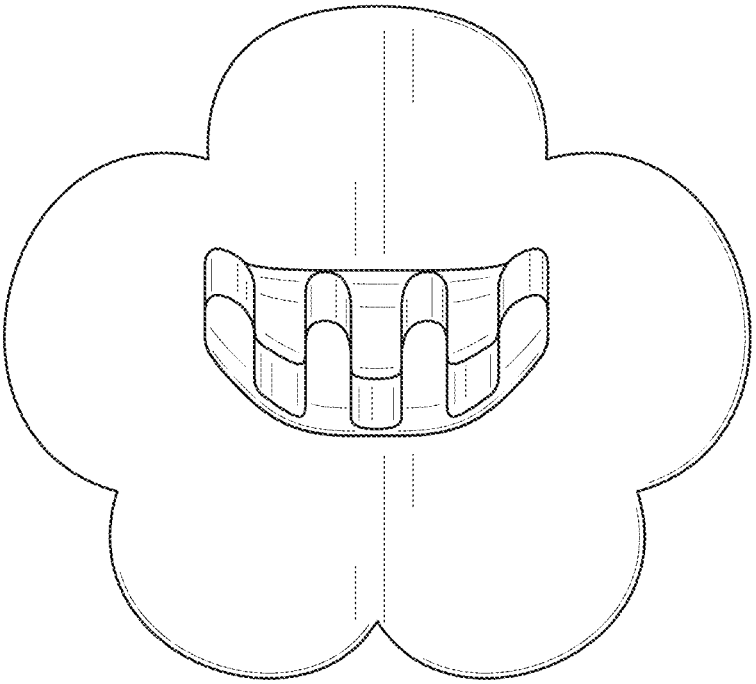
FIG. 4 AMENDED

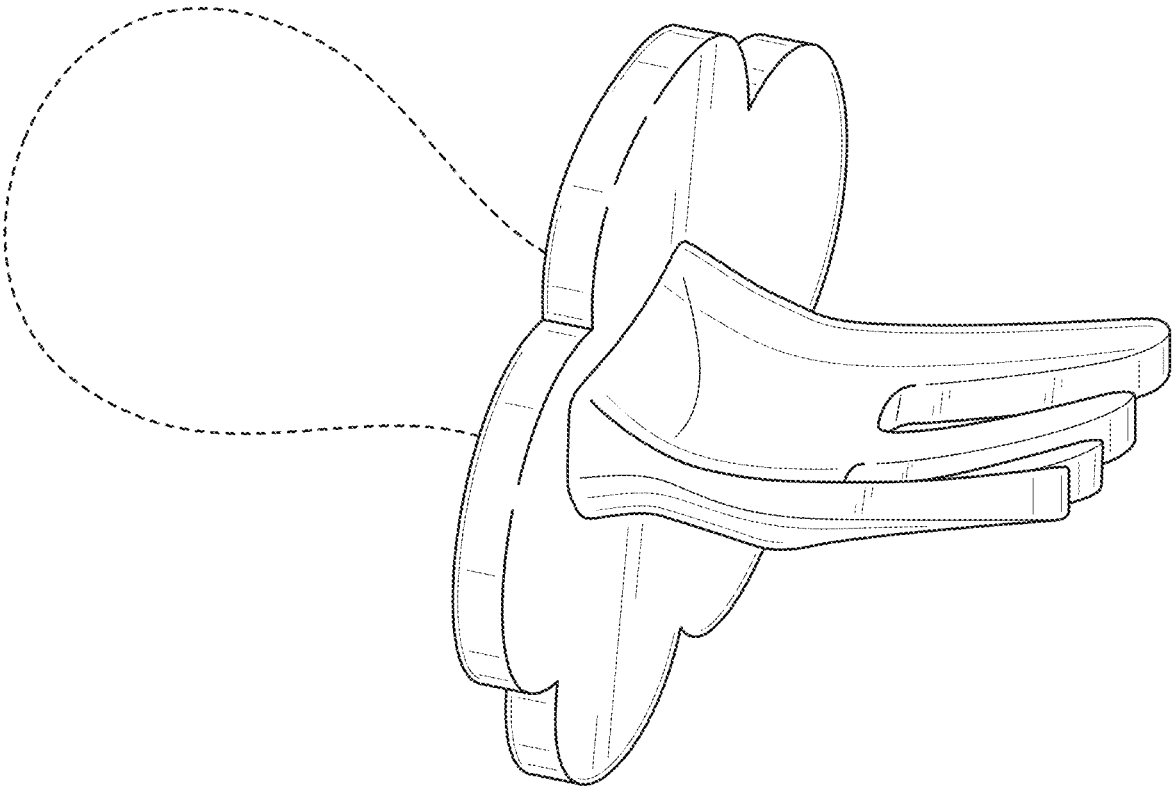
FIG. 5 AMENDED

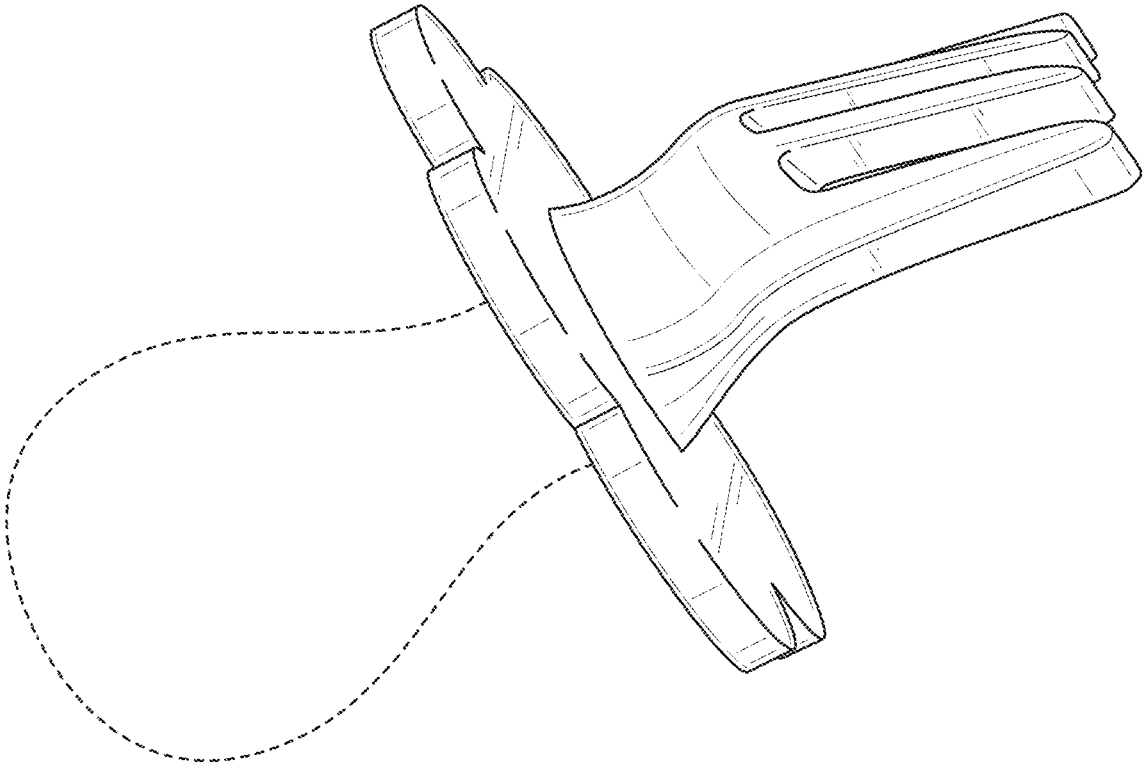
FIG. 6 AMENDED